Sept. 15, 1925.　　　　　M. E. GEROULD　　　　　1,554,082

TWINE HOLDER

Filed Jan. 4, 1924

M. E. Gerould
INVENTOR

BY Victor J. Evans
ATTORNEY

WITNESS:

Patented Sept. 15, 1925.

1,554,082

UNITED STATES PATENT OFFICE.

MARTIN E. GEROULD, OF ROCHESTER, NEW YORK.

TWINE HOLDER.

Application filed January 4, 1924. Serial No. 684,444.

*To all whom it may concern:*

Be it known that I, MARTIN E. GEROULD, a citizen of the United States, residing at Rochester, in the county of Monroe and State of New York, have invented new and useful Improvements in Twine Holders, of which the following is a specification.

This invention relates to a twine holder and cutter, the general object of the invention being to provide a container having a reel therein for holding the twine with means for renewing the twine when the reel is empty.

Another object of the invention is to provide means for attaching the holder to the person such means including a device for holding the loose end of the twine.

Another object of the invention is to combine a cutter with the holder.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
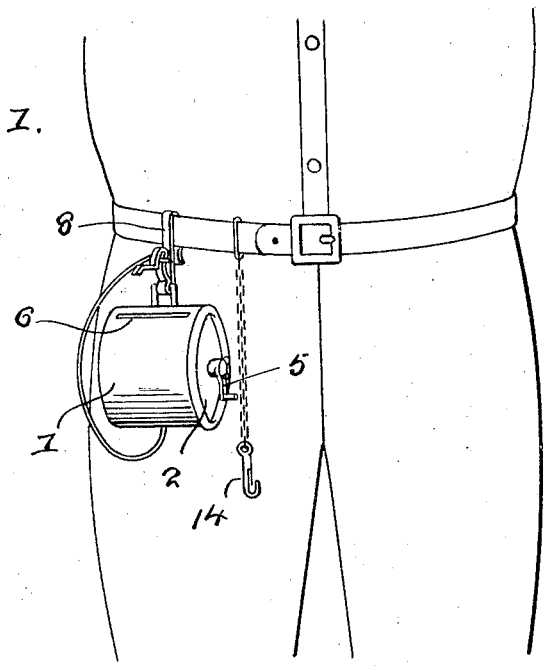
Figure 1 is a view showing how the device may be attached to a person.
Figure 2:
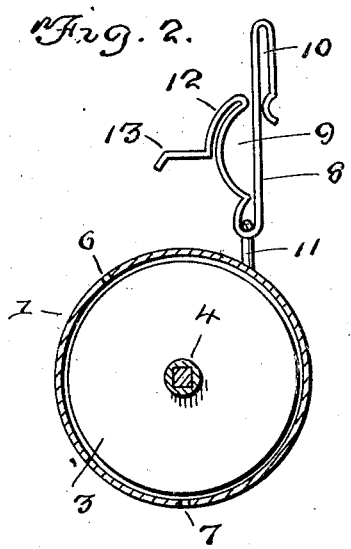
Figure 2 is a transverse sectional view through the device.
Figure 3:
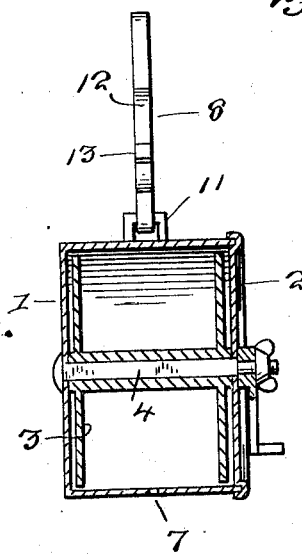
Figure 3 is a longitudinal sectional view.
Figure 4:
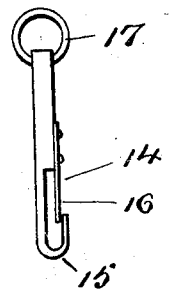
Figure 4 is a view of the cutter device.

In these views 1 indicates the body of the holder which is preferably of cylindrical shape. One end of this body is opened and this opened end is closed by a cover 2. A spool or reel 3 is placed in the holder and it is rotatably held therein by a bolt 4, to one end of which is secured a handle 5 by which the spool can be rotated. This bolt also acts to hold the cover in position though if desired the cover can be held on in any other suitable manner. The body is provided with a slot 6 which is used for winding the twine on the spool and it is also provided with a small opening 7 through which the twine passes while being removed from the holder.

A member 8, preferably formed of wire and which is bent to form the lower loop 9 and the upper loop 10 is connected with the holder by means of the link 11 which engages the lower loop. The upper loop is designed to engage a belt or other article of clothing of a person using the device as shown in Figure 1. The member 8 is also provided with an extension which is bent to form a loop 12 and a projection 13 which serve to hold the loose end of the twine.

A cutter 14 is also associated with the device and this cutter may be fastened to a holder by a chain on the link or it may be suitably connected to the person using the device. It is formed with a hook 15, the extremity of which is engaged by a blade 16 which is fastened to the shank of the device and acts to cut the twine which is placed in the hook part. A ring 17 is fastened to the shank to receive the connecting means.

From the foregoing it will be seen that I am providing simple and efficient means for holding twine so that it can be readily used without waste of time or material. The parts 12 and 13 of the member 8 serve to hold the loose end of the twine and the cutter 14 can be used for cutting the twine after a suitable length is pulled from the holder. After the holder is empty a new supply of twine can be wound on the reel of the same by removing the cap and threading the twine through the slot 6 and fastening it to the spool. Then the cap is replaced and the spool rotated to wind the twine thereon.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A twine holder of the class described comprising a body, a cap for closing the same, a spool in the body, and a handle for rotating the spool, said body having a small opening therein through which the twine is drawn and a slot for permitting rewinding of the spool.

2. A device of the class described comprising a twine holder, a loop member detachably connected therewith for attaching the holder to supporting means and means on said member for holding the loose end of the twine.

3. A device of the class described comprising a twine holder, a loop member connected therewith for attaching the holder to supporting means and means on said member for holding the loose end of the twine such means consisting of an extension having a looped part and a projection.

In testimony whereof I affix my signature.

MARTIN E. GEROULD.